United States Patent
Cloeren

[19]

[11] Patent Number: 5,147,195
[45] Date of Patent: Sep. 15, 1992

[54] EXTRUSION APPARATUS WITH ADJUSTABLE FLOW-RESTRICTING MEMBER

[75] Inventor: Peter F. Cloeren, Orange, Tex.

[73] Assignee: The Cloeren Company, Orange, Tex.

[21] Appl. No.: 714,794

[22] Filed: Jun. 13, 1991

[51] Int. Cl.⁵ .................. B29C 47/16; B29C 47/92
[52] U.S. Cl. .............. 425/133.500; 425/141; 425/192 R; 425/381; 425/462; 425/466; 425/131.100; 264/171
[58] Field of Search .............. 425/133.1, 133.5, 141, 425/145, 462, 466, 467, 381, 192 R; 264/171

[56] References Cited

U.S. PATENT DOCUMENTS

| | | | |
|---|---|---|---|
| 3,480,998 | 3/1967 | Erdberg | 425/133.5 |
| 3,680,997 | 8/1972 | Dukert et al. | 425/381 |
| 3,694,292 | 9/1972 | Schippers | 425/191 |
| 3,877,857 | 4/1975 | Melead | 425/133.5 |
| 4,533,308 | 8/1985 | Cloeren | 425/133.5 |
| 4,695,236 | 9/1987 | Predohl et al. | 425/131.1 |
| 4,708,618 | 11/1987 | Reifenhauser et al. | 425/462 |
| 4,731,213 | 3/1988 | Klepsch | 425/133.5 |
| 4,780,258 | 10/1988 | Cloeren | 425/133.5 |
| 4,784,815 | 11/1988 | Cloeren | 264/171 |
| 4,789,513 | 12/1988 | Cloeren | 264/171 |
| 5,035,596 | 7/1991 | Pohl | 425/133.1 |

FOREIGN PATENT DOCUMENTS 54-97663  8/1979  Japan ...................... 425/141

Primary Examiner—Jay H. Woo
Assistant Examiner—Khanh P. Nguyen
Attorney, Agent, or Firm—Timothy R. Kroboth

[57] ABSTRACT

The present invention provides a novel extrusion apparatus that is advantageous for converging rheologically dissimilar streams. Flow transition of a converging stream can be beneficially effected. For instance, a converging stream may be specially contoured by mere mechanical adjustment of a flow-restricting member of the apparatus.

16 Claims, 3 Drawing Sheets

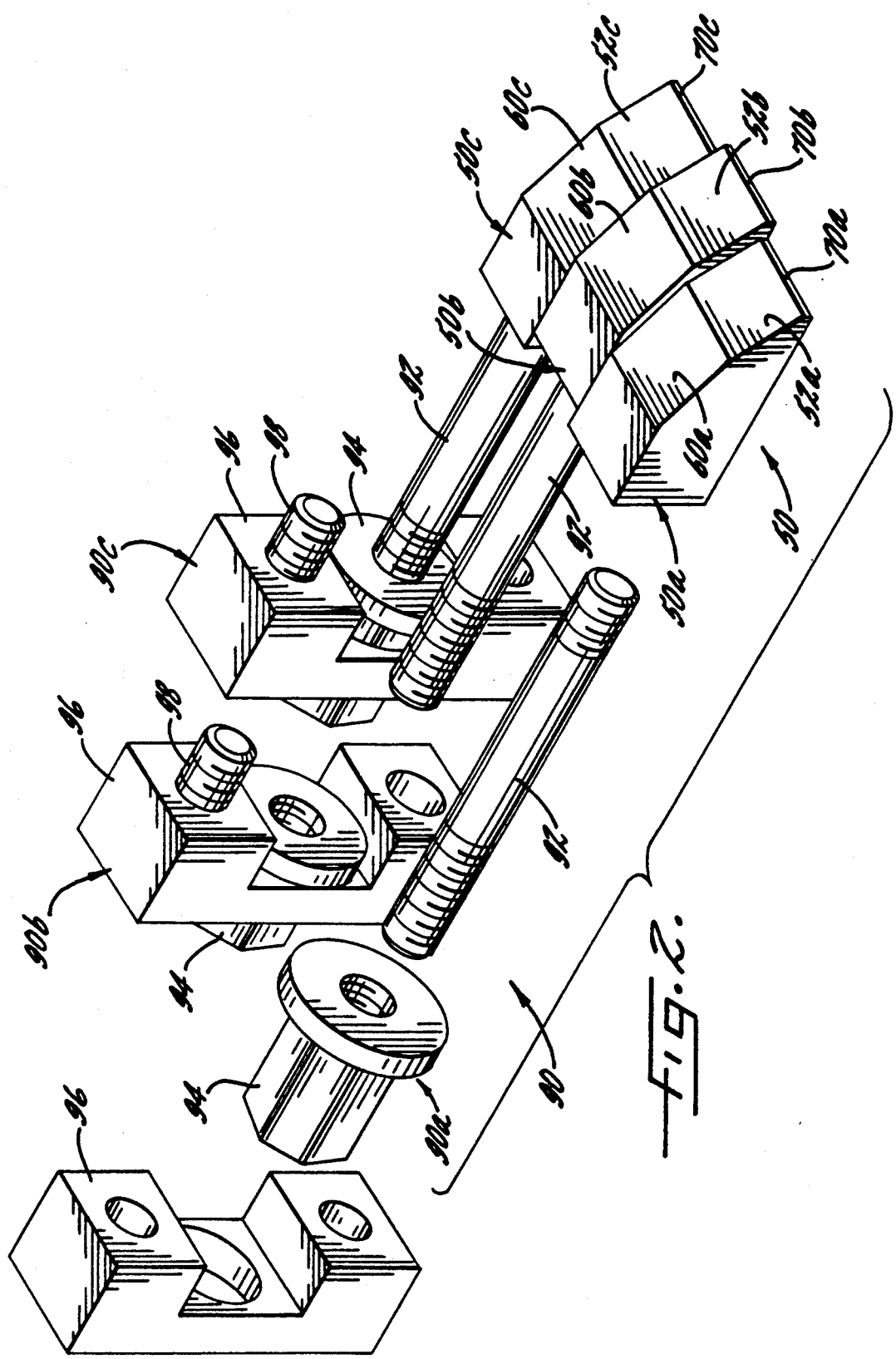

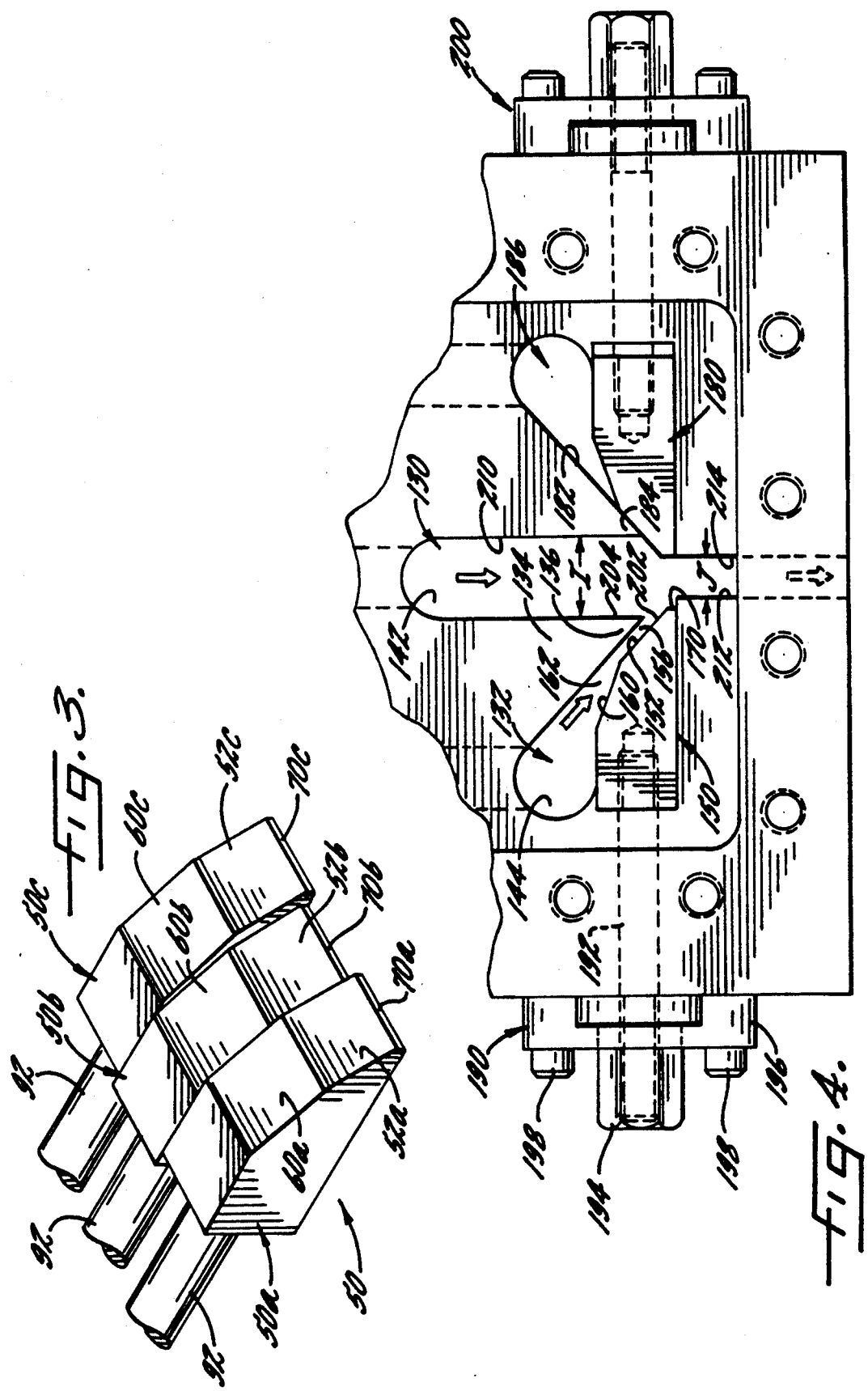

EXTRUSION APPARATUS WITH ADJUSTABLE FLOW-RESTRICTING MEMBER

BACKGROUND OF THE INVENTION

This invention relates to coextrusion of sheet and film product, made especially of thermoplastic compositions such as synthetic resins.

A rotatable distribution pin located proximate to the place of stream convergence, is illustrated by U.S. Pat. No. 4,789,513 to Cloeren. The replaceable distribution pin is provided with the grooved profile shown in FIG. 9 thereof.

The use of an adjustable gap control member for controlling flow from a melt chamber spaced above another melt chamber, to the other melt chamber, is exemplified by U.S. Pat. No. 3,877,857 to Melead. A beveled face of the gap control member cooperates with a wall to form the gap.

Forming a composite stream in a feedblock is illustrated by U.S. Pat. No. 4,784,815 to Cloeren and Wernery, and U.S. Pat. No. 4,695,236 to Predohl et al. Flow pressure of one stream is utilized to displace a portion of another stream. In an embodiment of the Cloeren et al device, stream convergence is effected prior in time to the flow pressure displacement.

In the Predohl et al patent, a rectangular adjusting bar is used to meter side channel flow into a main flow channel. The adjusting bar has a beveled portion located downstream of an input slot of the side channel. The beveled portion compensates flow across the width of the main flow channel. A portion of the adjusting bar may be provided with a concave or convex or sinusoidal profile.

However, a difficulty exists when converging streams of dissimilar rheological properties, that is, for instance, of dissimilar viscosities and elasticities. For example, when a melt stream has a high resistance to flow relative to a melt stream with which it is to be converged, it may be advantageous to provide a heavy edge flow of the high resistance melt stream prior to the convergence by use of a suitably contoured, stream-contacting surface. Similarly, it may be advantageous in other situations to provide a heavy center flow of one of the melt streams prior to the convergence. A drawback of the prior art device just described, is that to handle both possibilities, it would be necessary to replace one specially contoured, stream-contacting surface with a surface of very different geometrical configuration.

Accordingly, there remains a need for an improved extrusion apparatus that is advantageous for converging streams of dissimilar rheological properties. Beneficially, such an apparatus would be useful for the convergence of streams of a variety of rheological properties, without the necessity of replacing a specially contoured, stream-contacting surface.

SUMMARY OF THE INVENTION

It is accordingly an object of the present invention to provide an improved extrusion apparatus that is advantageous for converging streams of dissimilar rheological properties.

It is a further object to provide an improved extrusion apparatus that is useful for converging streams of a variety of rheological properties, without the necessity of replacing a specially contoured, stream-contacting surface.

Additional objects, advantages and novel features of the present invention are set forth in the description that follows, and in part will become apparent to those skilled in the art upon examination of the following description or may be learned by practice of the invention. The objects and advantages of the invention may be realized and attained by means of instrumentalities and combinations particularly pointed out in the appended claims.

To achieve the foregoing objects and in accordance with the purpose of the present invention, as embodied and broadly described herein, there is provided a unique extrusion apparatus that includes a first flow channel and a second flow channel which are separated by a divider member and which converge. A preferred feature of the apparatus is a segmented, flow-restricting member that provides an adjustable stream-contacting surface.

The segmented, flow-restricting member has face portions that cooperate with an opposing wall of the divider member to form an output gap of one of the flow channels. An adjustment assembly in operative communication with the flow-restricting member, is employed to adjust the gap.

Beneficially, a flow-restricting member in accordance with the present invention, may have an additional face portion that is so arranged with respect to the first flow channel that if the gap-forming face portion were in contact with the opposing wall, then the additional face portion would form a linear continuation of a downstream wall of the first flow channel.

Advantageously, a flow-restricting member in accordance with the present invention, may have a section of the gap-forming face portion, located within a boundary of the first flow channel as defined by an upstream wall of the first flow channel.

In the drawing and in the detailed description of the invention that follows, there are shown and essentially described only preferred embodiments of this invention, simply by way of illustration of the best mode contemplated by me of carrying out this invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference is now made to the accompanying drawing, which forms a part of the specification of the present invention, and which depicts preferred embodiments of an adjustable extrusion apparatus in accordance with the present invention.

FIG. 2 is an enlarged, partially exploded, perspective view of an adjustment assembly for the segmented, flow-restricting member of the extrusion apparatus of FIG. 1, which further shows the segments arranged to provide a heavy edge flow;

FIG. 3 is a partial perspective view of the segmented, flow-restricting member of FIG. 2, with the segments arranged to provide a heavy center flow; and FIG. 4 is a partial plan view similar to that of FIG. 1, of another preferred embodiment of an extrusion apparatus in accordance with the present invention.

DETAILED DESCRIPTION OF THE INVENTION

Figure 1:
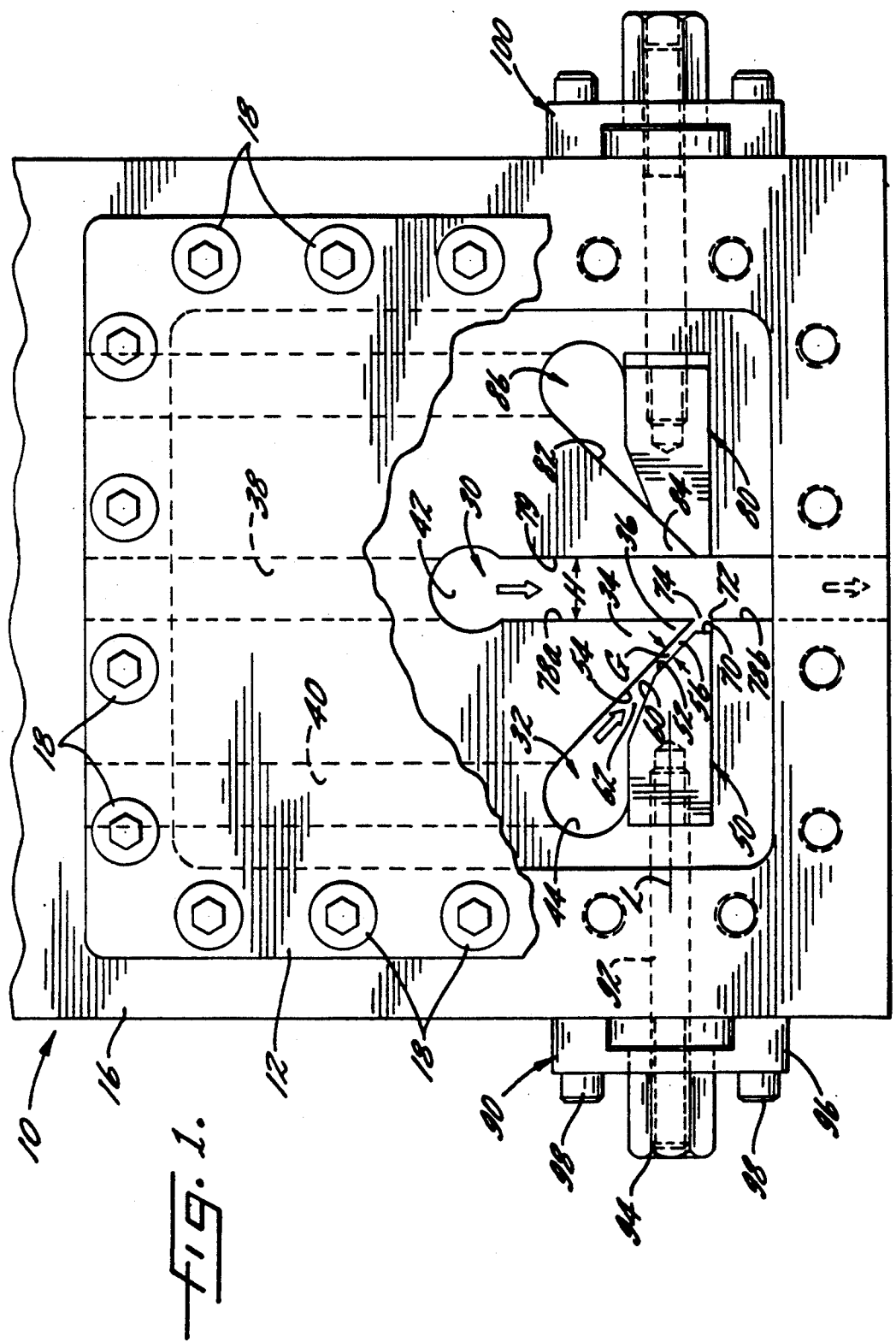
FIG. 1 is a plan view with a portion of a side plate removed, of a preferred embodiment of an extrusion apparatus in accordance with the present invention.

As explained above, the present invention is directed to a novel extrusion apparatus that is advantageous for converging streams of dissimilar rheological properties. It will be, of course, understood that the streams to be converged by use of this apparatus, could be rheologically similar. Likewise, it will be understood that a stream to be converged, may consist of more than a single layer.

Referring to FIG. 1, a preferred adjustable extrusion apparatus 10 in accordance with the present invention, is shown. The apparatus is depicted in, and as part of, a modified feedblock, with a portion of a side plate 12 broken away to expose the apparatus to view. The housing plug is bolted to a main body 16 of the feedblock by bolts 18.

In the main body of the feedblock are flow channels 30,32, which are separated by a divider member 34, which terminates in a pointed tip 36. Arrows indicate the main flow direction within channels 30,32. Feed channels 38,40 for channels 30,32 are shown. Each flow channel beneficially includes a transverse flow-providing chamber or manifold 42,44, as shown.

Disposed in the main body of the feedblock is a flow-restricting member 50. Restrictor bar 50 has a face 52 that cooperates with an opposing wall 54 of divider member 34 to form a flow-restricting channel portion 56 of flow channel 32. Face 52 is beneficially spaced apart from wall 54 a constant distance in the main flow direction of channel 32, so as to provide channel portion 56 with a constant gap G in the main flow direction.

As a preferred feature of the present invention, the restrictor bar is advantageously segmented, with, as shown in FIG. 2, planar, beveled faces 52a,52b,52c for restrictor bar segments 50a,50b,50c. Faces 52 are transversely situated with respect to one another. Upstream of, and at an angle to, faces 52, segmented, restrictor bar 50 also includes faces 60a,60b,60c, as shown in FIG. 2.

With continued reference to FIG. 1, upstream faces 60 cooperate with opposing wall 54 to provide a tapered channel portion 62 of flow channel 32. Tapered portion 62 decreases in gap in the main flow direction of channel 32, and connects manifold 44 to flow-restricting channel portion 56.

Downstream of, and also at an angle to, faces 52, segmented, restrictor bar 50 includes faces 70a,70b,70c, as shown in FIG. 2. With continued reference to FIG. 1, these faces can be understood to form flow channel 32 in part.

Downstream of faces 70 is a locus of complete displacement 72, which is characterized by the completion of flow pressure displacement of a portion of a stream in flow channel 30 by a stream exiting flow channel 32, and the completion of entry of the exiting stream into flow channel 30. The locus at which the displacement begins, is believed to depend on factors including the relative velocities of the converging streams. When the relative velocities and pressures of the converging streams are equal, that is, when the relative flow volumes per unit area are equal, then that locus would be expected to coincide with locus 72, that is, be immediately downstream of faces 70 as shown in FIG. 1. On the other hand, when the relative flow volume per unit area of the stream exiting channel 32, is greater than that of the stream in flow channel 30, then that locus would be expected to be shifted upstream of locus 72.

Upstream of locus 72, flow channels 30,32 converge at a locus 74. A suitable angle of flow channel convergence is about 45°. As can be understood in the case of the preferred embodiment depicted in the drawing, the angle between faces 52 and faces 70 of restrictor bar 50 is determined by the angle of flow channel convergence. Thus, an angle of channel convergence of about 45° necessitates an angle of about 135°(180°−45°) between faces 52 and faces 70. Other angles can be selected for the flow channel convergence.

The upstream location of locus of convergence 74 relative to locus 72, provides for downstream faces 70 to form a flow transition channel portion of flow channel 32. In the flow transition channel portion, there is a continual and progressive transition of flow. For instance, when the relative velocities and pressures of the converging streams are equal at locus of convergence 74, there is a transition to unequal flow volumes and equal flow pressures at locus of complete displacement 72.

Suitably, flow channel 30 may be provided with a gap H by walls 78,79, that is substantially the same in the main flow direction, immediately before and downstream of faces 70 of the restrictor bar.

Downstream faces 70 are conveniently at a right angle to a main axis L of restrictor bar 50, which is likewise conveniently oriented perpendicular to the main flow direction of channel 30, as well as to a wall 78 of flow channel 30. Faces 70 are beneficially spaced apart from an imaginary line that is a linear continuation of wall portions 78a,78b by a distance substantially equal to gap G of channel 32. Therefore, as illustrated with a second flow-restricting member shown in FIG. 1, that is, a restrictor bar 80, which is in contact with an opposing wall 82 of a divider member 84 so as to close the respective flow-restricting channel portion of flow channel 86, if flow-restricting channel 56 were closed, then downstream faces 70 of restrictor bar 50 would beneficially form a linear continuation of channel wall portions 78a,78b, and accordingly would not intrude into channel 30. As a matter of simplication for this description, restrictor bar 80 is identical in all respects to restrictor bar 50.

Restrictor bar 50 is conveniently axially slidable. In this way, gap G of flow-restricting channel portion 56 is increased or decreased. As shown in FIG. 1, the restrictor bar conveniently moves perpendicular to flow channel 30.

If restrictor bar 50 were oriented, say, at an about 45° angle to flow channel 30 (it being understood that the angle of flow channel convergence would be accordingly reduced from that shown in FIG. 1), then downstream faces 70 would be spaced apart from the earlier-described imaginary line by a distance greater than gap G in order for the downstream faces to form a linear continuation of channel walls 78a,78b when flow-restricting channel 56 is closed. As can be understood by one skilled in the art, the appropriate distance relates to the sine of the angle of flow channel convergence.

Adjustment of the restrictor bar is provided for by an adjustment assembly 90, which advantageously may effect adjustment of at least one of faces 52 independently of another of faces 52 so as to provide flow-restricting portion 56 with an unequal gap G in the transverse flow direction. A suitable adjustment assembly for this purpose, consists of assemblies 90a, 90b, 90c, as shown in FIG. 2, each of which includes a threaded rod 92 in engagement at one end with the respective restrictor bar segment and in engagement at the other end with a threaded nut 94 for effecting adjustment. The threaded nut cooperates with a retainer member 96, which is secured by bolts 98 to main body 16.

Gap G may be of constant cross-section in the transverse flow direction. However, when a melt stream having a high resistance to flow relative to a melt stream flowing through channel 30, is passed through channel 32, it may be advantageous to provide a heavy edge flow of the high resistance melt stream by arranging a segmented, restrictor bar in accordance with the apparatus of the present invention, as shown in FIG. 2. As a consequence, uniform layering of the combined flow stream will be promoted when the combined stream is passed through a downstream die manifold (not shown). Conversely, to provide a heavy center flow, a segmented, restrictor bar in accordance with the apparatus of the present invention, may be arranged as shown in FIG. 3.

It will be understood that a segmented, restrictor bar in accordance with the apparatus of the present invention, is not limited to three segments, or to planar faces on each segment.

In operation, segmented, restrictor bar 50 is arranged as shown in FIG. 2 by manual adjustment of adjustment assembly 90, and segmented, restrictor bar 80 is arranged as shown in FIG. 1 by adjustment of assembly 100 so as to close the flow-restricting channel portion of flow channel 86. Thereafter, a melt stream is passed into, and undergoes transverse spreading in, manifold 42 of flow channel 30. The stream then continues to flow in the main flow direction until it reaches locus of convergence 74, which is immediately downstream of pointed tip 36 of divider member 34.

Concurrently, a melt stream having a high resistance to flow and rheologically dissimilar to the stream in channel 30, passes into and undergoes transverse spreading in manifold 44 of flow channel 32. The stream then passes through the specially configured, flow-restricting portion 56 of channel 32 provided by the arrangement shown in FIG. 2, as a result of which the stream is provided with a heavy edge flow.

At locus of convergence 74, convergence of the two streams occurs to form a composite stream. If desired, a composite stream having a layer of greater thickness than gap G could be formed. This result could be achieved by providing the stream exiting channel 32 with a relatively greater flow volume per unit area than the stream in the flow channel 30 at convergence 74. Thereafter, the stream exiting channel 32 enters channel 30 at locus of displacement 72. The composite stream is then passed through a downstream die manifold.

With reference to FIG. 4, another preferred embodiment in depicted. Like parts have been designated with numbers corresponding to like parts of the embodiment of FIG. 1. For sake of brevity, details previously described are not repeated.

FIG. 4 illustrates an extrusion apparatus having multiple transition zones. A flow-restricting member 150 includes an output gap-forming face 152, an upstream face 160, and a downstream face 170, which is at an angle to face 152. A portion 202 of face 152 is within the boundary of a flow channel 130 as defined by an upstream wall 204. As a preferred feature of the present invention, restrictor bar 150 is advantageously segmented.

In addition to the flow transition zone provided by upstream face 160, face portion 202 forms a flow transition zone of flow channel 132 that beneficially makes possible mechanical profiling of the stream exiting flow channel 132 within the boundary of flow channel 130. Face portion 202 advantageously cooperates with both of flow channels 130,132. The flow transition zone formed by face portion 202 bridges between and is continuous with a flow-restricting channel portion 156 formed by face 152, and a flow transition zone provided by face 170.

Flow channel 130 may be provided with a gap I by upstream walls 204,210, that is greater than a gap J formed by downstream walls 212,214. As depicted in FIG. 4, gap I is upstream of the flow transition zone formed by face portion 202, and gap J is downstream of face 170.

As illustrated with a second flow-restricting member shown in FIG. 4, that is, a restrictor bar 180, which is in contact with an opposing wall 182 of a divider member 184 so as to close the respective flow-restricting channel portion of a flow channel 186, if flow-restricting channel 156 were closed, then face 170 would beneficially form a linear continuation of downstream channel wall 212 and would not intrude within the boundary of flow channel 130 defined by downstream wall 212. Furthermore, face 152 would function as a displacement-effecting, transition wall for mechanically producing gradual lateral displacement of the stream in flow channel 130. A wall of this type is illustrated in FIG. 10 of U.S. Pat. No. 4,784,815.

In the preceding description of the present invention, there are shown and essentially described only preferred embodiments of this invention, but as mentioned above, it is to be understood that the invention is capable of changes or modifications within the scope of the inventive concept expressed herein. Several changes or modifications have been briefly mentioned for purposes of illustration.

I claim:

1. An extrusion apparatus comprising a first flow channel and a second flow channel which are separated by a divider member and which converge, said first flow channel having a main flow direction; a flow-restricting member having a first face portion that in a first position, together with an opposing wall of said divider member defines an output gap of said second flow channel, and that in a second position, contacts said opposing wall and a second face portion of said flow-restricting member in said second position, forms a linear continuation of a downstream wall of said first flow channel; and means in operative communication with said flow-restricting member, for moving said flow-restricting member between said first position and said second position to adjust said gap.

2. The extrusion apparatus of claim 1, wherein a main axis of said flow-restricting member is oriented generally perpendicular to said first flow channel so that said flow-restricting member is axially slidable perpendicularly to said first flow channel.

3. The extrusion apparatus of claim 1, wherein said flow-restricting member is segmented.

4. The extrusion apparatus of claim 3, wherein said gap-adjusting means comprises a plurality of adjustment assemblies each in operative communication with an individual segment of the segmented, flow-restricting member.

5. The extrusion apparatus of claim 1, wherein said second face portion in said second position defines a flow portion of said first flow channel, and wherein said first flow channel has a width immediately downstream of said flow portion that is substantially the same or less than a width immediately upstream of said flow portion.

6. The extrusion apparatus of claim 1, wherein said second face portion in said second position defines a flow portion of said first flow channel, and wherein said first flow channel has a width immediately downstream of said flow portion that is substantially the same as a width immediately upstream of said flow portion.

7. An extrusion apparatus comprising a first flow channel and a second flow channel which are separated by a divider member and which converge, said first flow channel having a main flow direction; a flow-restricting member having a first stream-contacting face, a portion of which in a first position together with an opposing wall of said divider member defines an output gap of said second flow channel, and in a second position contacts said opposing wall and a second stream-contacting face of said flow-restricting member in said second position, forms a linear continuation of a downstram wall of said first flow channel, said first stream-contacting face having a stream-contacting portion which projects inward of a boundary of said first flow channel as defined by an upstream wall of said first flow channel and means in operative communication with said flow-restricting member, for moving said flow-restricting member between said first position and said second position to adjust said gap.

8. The extrusion apparatus of claim 7, wherein a main axis of said flow-restricting member is oriented generally perpendicular to said first flow channel so that said flow-restricting member is axially slidable perpendicularly to said first flow channel.

9. The extrusion apparatus of claim 7, wherein said flow-restricting member is segmented.

10. The extrusion apparatus of claim 9, wherein said gap-adjusting means comprises a plurality of adjustment assemblies each in operative communication with an individual segment of the segmented, flow-restricting member.

11. The extrusion apparatus of claim 7, wherein said second face portion in said second position defines a flow portion of said first flow channel, and wherein said first flow channel has a width immediately downstream of said flow portion that is less than a width immediately upstream of said flow portion.

12. An extrusion apparatus comprising a first flow channel and a second flow channel which are separated by a divider member and which converge at a locus of convergence, said first flow channel having a main flow direction; a segmented, flow-restricting member located adjacent said locus of convergence, and having a plurality of face portions that together with an opposing wall of said divider member define an output gap of said second flow channel, and having a plurality of stream-contacting face portions downstream of, and at an angle to, the output gap-forming face portions, wherein said stream-contacting face portions define a flow portion of said first flow channel, and wherein said first flow channel has a width immediately downstream of said flow portion that is substantially the same or less than a width immediately upstream of said flow portion; and means in operative communication with said flow-restricting member, for moving said flow-restricting member for adjusting said gap.

13. The extrusion apparatus of claim 12, wherein said gap-adjusting means comprises a plurality of adjustment assemblies each in operative communication with an individual segment of said segmented, flow-restricting member, for adjusting at least one of said plurality of face portions independently of another of said plurality of face portions.

14. The extrusion apparatus of claim 12, wherein a main axis of said segmented, flow-restricting member is oriented generally perpendicular to said first flow channel so that said flow-restricting member is axially slidable perpendicularly to said first flow channel.

15. The extrusion apparatus of claim 12, wherein said first flow channel has a width immediately downstream of said flow portion that is substantially the same as a width immediately upstream of said flow portion.

16. The extrusion apparatus of claim 12, wherein said downstream faces portions are aligned with said main flow direction of said first flow channel.

* * * * *